Jan. 31, 1967  M. J. FAHRENBACH ETAL  3,301,065
LIQUID SAMPLE SUPPLY APPARATUS
Filed March 20, 1964  6 Sheets-Sheet 1

FIG. 1

| STEP | A | B | C | D | E | F | G | H | REPEAT |
|---|---|---|---|---|---|---|---|---|---|
|  | WASH CUP INDEX IN | TUBE DOWN TO WASH HEIGHT | WASH | TUBE UP | WASH CUP INDEX OUT | TUBE DOWN TO SAMPLE HEIGHT | SAMPLE | TUBE UP |  |
|  | START |  | 130 ± 40 |  |  |  | 130 ± 40 |  |  |
| DEGREES FOR STEP | 30 | 10 | 130 ± 40 | 10 | 30 | 10 | 130 ± 40 | 10 |  |
| TOTAL MAX SAMPLE | 0–30 | 30–40 | 40–130 | 130–140 | 140–170 | 170–180 | 180–350 | 350–360 |  |
| TOTAL MAX WASH | 0–30 | 30–40 | 40–210 | 210–220 | 220–250 | 250–260 | 260–350 | 350–360 |  |
| WASH CUP CAM | IN |  |  |  | OUT & REMOVES BALL |  |  |  |  |
| SAMPLE RACK INDEX |  |  |  |  |  |  |  |  |  |

DEGREES OF ROTATION OF MAIN CAM

INVENTORS.
MARVIN JAY FAHRENBACH
PAUL HADLEY BELL
ELLSWORTH ROLAND SANDHAGE
BY
Samuel Branch Walker
ATTORNEY

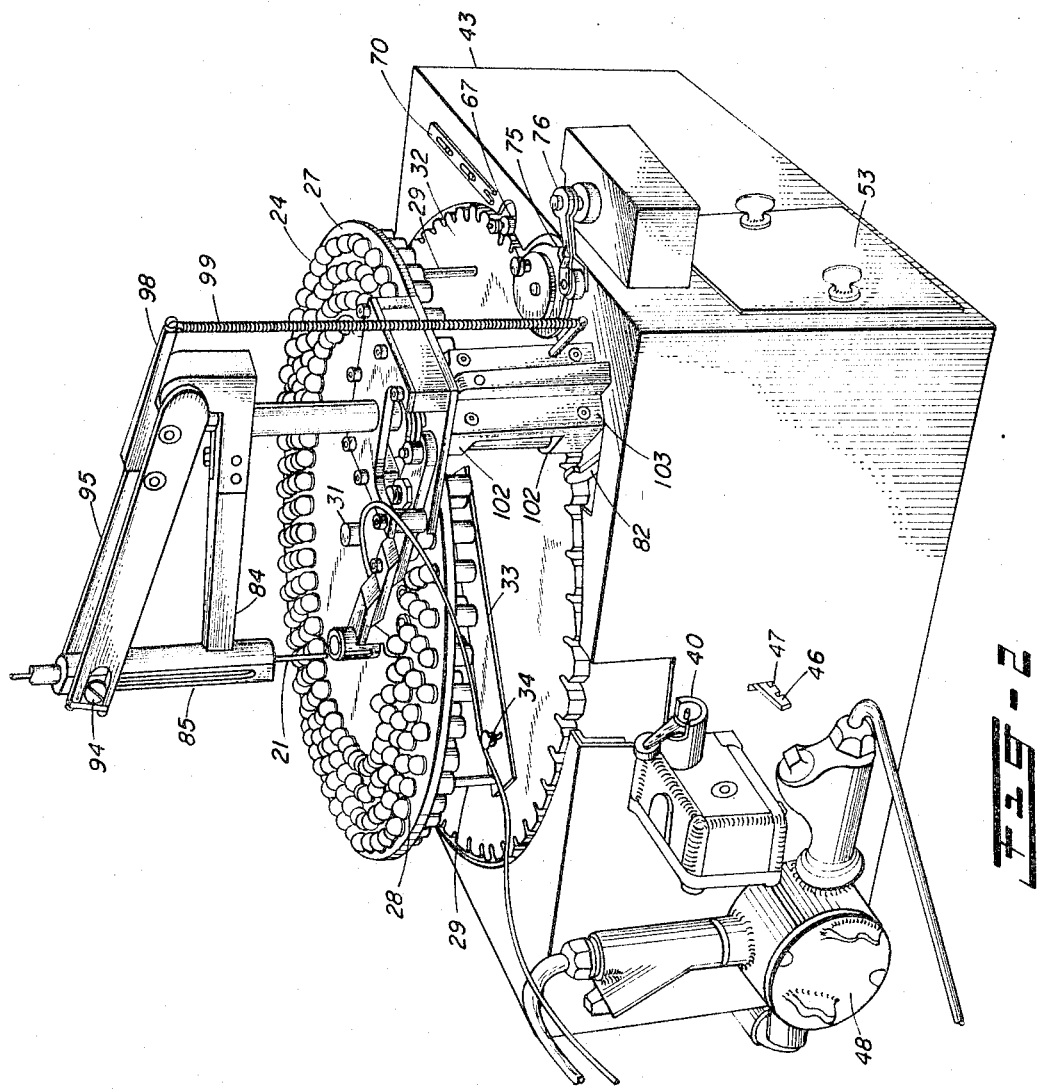

INVENTORS.
MARVIN JAY FAHRENBACH
PAUL HADLEY BELL
ELLSWORTH ROLAND SANDHAGE

Samuel Branch Walker
ATTORNEY

Jan. 31, 1967 M. J. FAHRENBACH ETAL 3,301,065
LIQUID SAMPLE SUPPLY APPARATUS
Filed March 20, 1964 6 Sheets-Sheet 5

INVENTORS.
MARVIN JAY FAHRENBACH
PAUL HADLEY BELL
ELLSWORTH ROLAND SANDHAGE
BY
Samuel Branch Walker
ATTORNEY Jan. 31, 1967 M. J. FAHRENBACH ET AL 3,301,065
LIQUID SAMPLE SUPPLY APPARATUS
Filed March 20, 1964 6 Sheets-Sheet 6

INVENTORS.
MARVIN JAY FAHRENBACH
PAUL HADLEY BELL
ELLSWORTH ROLAND SANDHAGE
BY
*Samuel Brand Walker*
ATTORNEY

3,301,065
LIQUID SAMPLE SUPPLY APPARATUS
Marvin Jay Fahrenbach, Tomkins Cove, N.Y., Paul Hadley Bell, Ridgewood, N.J., and Ellsworth Roland Sandhage, Pearl River, N.Y., assignors to American Cyanamid Company, Stamford, Conn., a corporation of Maine
Filed Mar. 20, 1964, Ser. No. 353,409
12 Claims. (Cl. 73—423)

This invention relates to an apparatus and method for permitting the automated analysis of liquid samples in which separate discrete samples are individually sequentially analyzed with a mechanized readout; thus permitting the analysis of samples without the requirement of an operator in attendance, and to a sample feed system that permits an adjustable wash cycle between samples, and an interlock that stops the device in case of internal failure, and can be set to stop after a specified number of samples, or when all samples are analyzed.

The cost of labor per chemical analysis in general has been rising and as more sophisticated test procedures are devised in the chemical, biological and related fields an increased number of duplicate analyses have been required. Therefore, it has been recognized as desirable to devise methods and apparatus which permit maximum results with a minimum of operator time. In the large scale process industries, such as oil refineries, devices are in constant demand which will determine some particular variable for purposes of information or control, and various degrees of automation have been and are becoming common.

Automation is coming to laboratory analysis procedures. One current review of such devices appears in Chemical and Engineering News, vol. 41, Nos. 49 and 50, pages 112 in each, for December 9, 1963, and December 16, 1963, entitled "Instruments for Clinical Chemistry Laboratories."

A series of papers on the subject was presented entitled "Automated Chemical Analyses" in the annals of the New York Academy of Sciences, vol. 87, article 2, pages 609–651 (July 1960). For some such automated analyses or for some of the instruments for automated analyses such as the flame photometer disclosed in "Improved Method of Flame Photometry," Industrial and Engineering Chem., Anal. Ed. (18, 19–24) (1946), John W. Berry, David G. Chappel and R. Bowling Barnes, or the flame ion detector of United States Patent 3,027,241, A. J. Andreatch and W. B. Innes, "Air Pollution Measurement," March 27, 1962, automated sampling devices for individual samples have been desired. Such samplers have included "merry-go-rounds" or turntables in which samples were placed in separate test tubes in holes in circular racks and the samples sequentially removed by aspiration. To separate the samples the liquids have been segmented between samples by introduction of an immiscible liquid, for example as disclosed in United States Patent 3,047,367, Kessler, or air bubbles have been introduced between sequential samples, such as disclosed in United States Patent 2,899,280, Whitehead et al. Sometimes where cross-contamination between samples is a problem, alternate sample containers are filled with a wash liquid which is miscible. Such a supply of wash liquid is disadvantageous because twice as many sample cells are required and the timing mechanisms are unduly complex unless the wash is the same volume as the sample.

Turntable type receivers have been used for collecting fractions, such as disclosed in United States Patent 2,493,382, Paul H. Bell, "Automatic Sample Collector," January 3, 1950.

Pivoted nozzles have been used for filling containers. One use, in encapsulation, of dipping nozzles appears in United States Patent 2,624,164, A. M. Donofrio, "Method of and Apparatus for Encapsulating Liquid and Semiliquid Substances and the Like," January 6, 1953.

In filling operations, gravity assists, and the nozzle need only be over the container at the time of liquid discharge. For feeding liquid samples, for analysis, the aspirator tube must drop below the liquid level, and for uniformity of sampling, sould either aspirate all of the sample, or a fixed volume of sample less than the total volume in the sample cup. For some analyses, the concentration in the sample cup is measured independent of volume. Analyses in which the volume is of importance are far more common.

The apparatus of the present invention can sample by total volume in the sample cup, or identical volumes from each sample cup. Where the concentration only is of importance, either system can be used.

In accordance with the present invention the processing is simplified by providing a sample, either test, hereafter called an "unknown" sample, or calibration sample, in every sample cup in a sample cup rack with the aspirating nozzle alternately dropping into a sample cup, and rising and then dropping into a wash cup moved into the path of the aspirating nozzle, above the level of the sample cups, to permit aspiration of a wash liquid from a separate wash liquid dispenser, equipped with a constant level device. Thus, the aspiration of the sample and the aspiration of the wash liquid are independently timed operations so that the duration of each may be independently selected.

The samples are protected against evaporation by placing a ball, such as a small rubber ball or marble on top of each sample cup. Conveniently a ball displacement arm functioning with and as part of the mechanism for interposition of the wash cup simultaneously displaces the shielding ball from the successor sample cup to permit the subsequent entry of the aspirating nozzle into each sample cup. The sample cups may be arranged on a turntable in concentric rows with means to displace the aspirating nozzle from circle to circle on completion of analysis of samples in each circle, or the sample cups may be arranged in a spiral of Archimedes with constant radial motion of the aspirating nozzle. Alternatively, for major installations, the sample cups are fed sequentially in a fixed path either individually on a traveling belt, or in pallets from a suitable storage magazine, which has such capacity as is desired under the circumstances, and which, of course, is designed to feed the samples in a predetermined order. For example, pallets of ten samples may be fed along the belt with the belt being long enough for a convenient working number of samples to be placed on the belt, or fed to the belt so that the analyzer may be run continuously and samples inserted in accordance with preferred labor schedules.

Any or all parts of the apparatus may be temperature controlled to provide a cycle adapted to a specific analytical procedure. Some biological samples must be kept chilled or thermally cycled just before analysis. If the samples are light sensitive or sensitive to atmospheric gases, a protective shield is interposed.

Additionally, an important part of the present invention is the concept of and equipment for reading out the results of each analysis on a printing readout or line recorder, either with peak height or the area under the peaks graphically or mechanically or electrically integrated for the sample values for each successive analysis, with a sensing mechanism which senses the recorder position or readout value continuously, or at selected intervals, and which turns off the equipment to protect remaining samples if, for any reason, the values on the recorder or readout go beyond the range of proper results, or if the readout gives a constant reading. Errors of these types with over, under or constant values may be introduced by a failure of an analytical device, clogging of a nozzle, failure of a reagent supply, breaking of tubing connections, thermostat failure or other peril to which mechanical devices are subject.

An additional important advantage of the present invention is providing calibration samples of known characteristics at intervals in a sample cup feed, thus providing a characteristic readout value periodically which serves to (a) check the accuracy of the instrument and analytical procedures, (b) aid in counting or ascertaining the number of a sample corresponding to a particular peak, and (c) when interconnected with the automatic cut-off device, to suspend operation of the analysis assembly to preserve remaining samples if any calibration sample gives an off specification reading or erroneous indication. Such fail safe devices also stop operations automatically after successful conclusion of a run and can be set to wash out the whole apparatus automatically. Thus, the present apparatus is self-checking, determines its own errors, and quits operating when an error occurs, to protect any samples remaining, thus permitting more effective long-term operation without human intervention, unless or until required by mechanical failure.

The present device either integrally is, or may be, adapted to utilize a wide variety of analytical procedures. Where the concentration in a sample is particularly characteristic the peak height from a sample is most characteristic, and usually only a part of each sample is withdrawn so that various size samples may be supplied and a representative portion of each taken. On the other hand, for some analytical procedures it is more convenient to utilize all of the samples, in which case integration of the area under a peak is required as the peak width as well as the peak height are needed to integrate the area. For withdrawal of the entire sample, conveniently, the aspiration nozzle is of a plastic such as polytetrafluorethane and the aspiration tube is dropped far enough to rest on the bottom of the sample cup and thus withdraw the entire sample. The bottom of the aspiration nozzle should be notched so that it does not form a liquid-tight seal against the bottom of the sample cup. The aspirating tube follows a vertical path, and hence more easily is adaptable to varying sample cup depths.

If the sample may become nonhomogeneous on standing, the present apparatus incorporates an agitating mechanism to agitate the sample just prior to sampling. This may be a supersonic mechanism which contacts the outside of the sample cell as clamping jaws which are supersonically driven or may be a mechanical agitator attached to the aspiration arm, which agitates the sample prior to the one being aspirated. With this embodiment the sealing ball is knocked off in time to permit the agitator to enter and an additional wash cup may be present to wash the agitator. The agitator may be a rotary driven stirrer or some form of a plate which is raised and lowered to induce homogeneity. Other variants are, of course, obvious to those skilled in the art.

The tubes connecting the present sample feeder to the analyzing system are usually fairly small and the rates of flow are such that laminar flow exists in most of these tubes. Therefore, there is a tendency for mixing between successive increments. Where desired, the separate increments may be separated by air bubbles. The air bubbles may be drawn in only between the samples and the wash and the wash and the succeeding sample, etc., but more conveniently, the aspirating nozzle may be reciprocated so as to immerse the end in the sample or wash liquid and then withdrawn enough to suck a bubble of air, followed by another increment of liquid, followed by an additional increment of air—so that each of the samples and each wash between samples is broken up into increments by air bubbles. As the air bubbles substantially fill a small tube the interfaces between the bubbles and the walls tend to sweep the walls, and thus keep each increment homogeneous and reduce mixing with the increment before or following.

On the other hand, some test procedures use sample liquids which are deleteriously affected by air so that either a shield of an inert gas is used or the aspiration is controlled so that aspiration only occurs while the nozzle is below the liquid level. This is conveniently accomplished by a switch or cam or clutch in the aspirator pump drive means to drive the aspirator only when the aspirator nozzle is immersed in liquid in its down position, whether such down position is down to the wash level or down to the sample level.

The present sample feeder may be used with either aqueous samples or non-aqueous samples. If sample liquids such as isopropanol or ether are used, a wash liquid compatible therewith is required and the electrical elements are designed as explosion proof. Explosion-proof wiring is more expensive but is good insurance against possible explosions where volatile explosive solvents are used either in the sample cups or the wash liquid. One alternative to the use of explosion-proof wiring is pneumatic drive throughout with air valves rather than electrical switches being used to actuate or control functions. As a single drive motor may be used with a minimum of switches, the present device permits economical design using explosion-proof techniques.

Conveniently, but not necessarily, the sample cup rack is indexed to the drive mechanism but removable so that an entire sample cup rack with a new set of samples may be introduced at one time. This permits placing the sample cup rack containing up to 200 sample cups arranged 50 in each of 4 concentric circles or such other configuration as most conveniently accommodates requirements for the number of samples to be analyzed without operator attention. Obviously the number of concentric circles containing sample cups may be greater or lesser than 4 and the number of sample cups in each concentric circle may be greater or lesser than 50. Sample cup racks holding 200 sample cups have proved to be a very convenient number as the sample cup rack of this size is small enough to be conveniently handled and yet large enough to hold a supply of samples which will usually represent at least about an eight-hour run to the automatic analysis equipment. Where the samples are rapidly run and required in large numbers, a much larger sample cup rack may be used, for instance 5 or 6 rows, of 75 or 100 cups.

Obviously, the size of sample cups can vary depending on the size of the sample required for a particular analysis. For many instances a sample cup that will hold from 2 to 25 milliliters of solution is convenient. Test tubes or small vials, supported by their rims, are convenient but the size of the apertures in the sample rack and cup volume and arrangement depend on the designed use. One illustrative embodiment is set forth in detail in the following drawings; variations are obvious to those mechanically adept.

FIGURE 1 shows the operating cycle timing.
FIGURE 2 is a pictorial assembly view.
FIGURE 3 is a top view, partially broken away, of the sample feeder of FIGURE 2.
FIGURE 4 is a top view of the index plate.
FIGURE 5 is a bottom view of the index plate.
FIGURE 6 is a pictorial view of one drive mechanism and counter.
FIGURE 7 shows details of the vertical lift cam.
FIGURE 8 shows a pointed sample cup for complete aspiration of sample.
FIGURE 9 shows a line recording of the analytical values showing calibration peaks and safety cut-off points.
FIGURE 10 is a block diagram of the analysis system.

Figure 3:
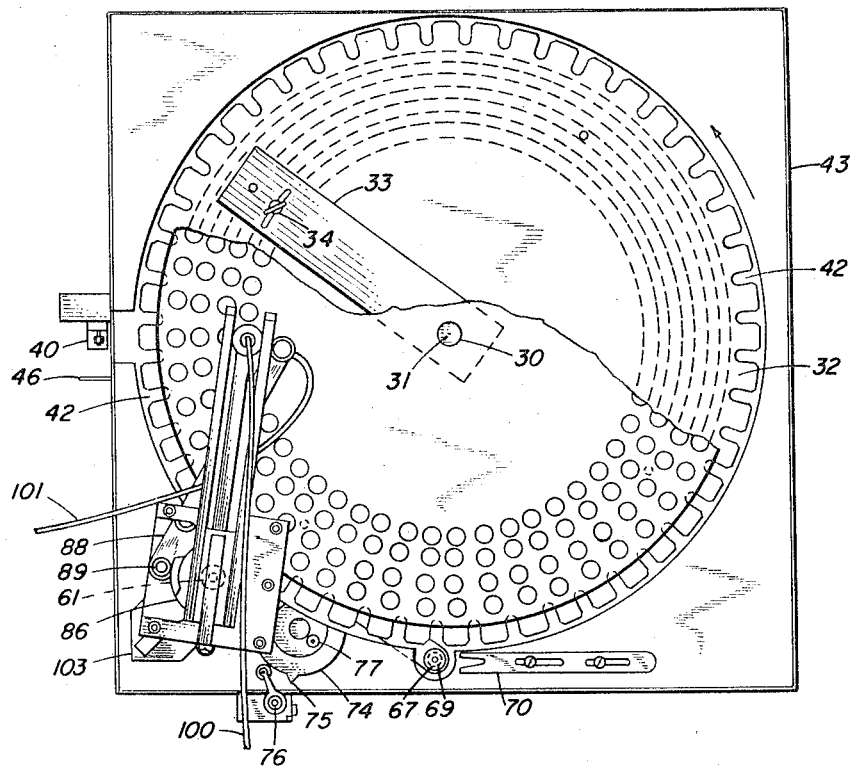
Figure 4:
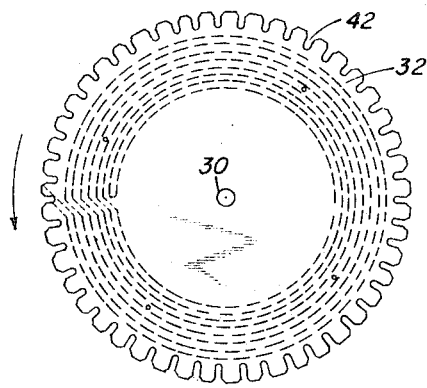

The operating cycle is diagrammatically illustrated in FIGURE 1 in which an aspirator tube 21, the lower end of which serves as an aspirating nozzle, descends into a wash cup 22 which washes the aspirator tube internally and externally. By cam means, later described, the timing is accomplished and conveniently expressed in degrees of rotation of the aspirator vertical lift cam 52. The various phases are shown as lettered steps, for aid in identification. Several operations occur simultaneously in some phases.

Step A is the indexing of the wash cup, which occurs during ten degrees of rotation of the vertical cam. The following twenty degrees is also used in this phase, as for different concentric rows of sample cups, timing is changed, as shown later. The following ten degrees, namely from 30 to 40 degrees of the vertical cam, is utilized to lower the aspirator tube to wash height. This is shown as step B. The time of washing, shown as step C, is variable and conveniently is adjustable to from 90 to 170° of rotation of the vertical cam, so that the washing step in which wash liquid is aspirated through the aspirator tube extends from 40° to an adjustable point from 130° to 210° of rotation. The next 10° is step D, raising the aspirator tube. In step E of 30° the wash cup is indexed out from under the aspirator tube and a ball displacement lever 23 operating in timed relationship with the wash cup and conveniently attached thereto removes a ball 24 used as a seal on a sample cup 25. In step F of 10° the aspirator tube drops down to sample height and aspirates a liquid sample 26 from the sample cup 25. This step of aspiration can run from 170° to 90°, varied inversely as the length of the wash cycle in step C. After the completion of step G, which is the sample withdrawal, the remaining 10° of rotation, step H, is used to raise the aspirating tube. At this point the cycle repeats for a succeeding sample cup. As the aspirator tube is being lowered into and is aspirating from the wash cup during the interval from zero to 130° minimum, to zero to 210° maximum, of rotation of the vertical cam, part or all of this period is used for indexing the sample cup rack 27 to place another sample cup under the aspirator tube. 70° of rotation allows adequate time to index the sample cup rack. This can be during phases A, B and C, a minimum of 130°, so relative timing is not critical.

The wash step takes 130°±40°, that is from 90° to 170° of rotation, and starts at 40°, to conclude at 130° to 210°. Similarly, the sample withdrawal step, G, is the time of 130°±40°, that is from 170° to 90°, and starts at 180° to 260° of rotation, and concludes at 350° of rotation.

Conveniently the wash and sample withdrawal steps vary from 130° by increments of 10° in either direction, for a total of nine distinct cycles. More can be included by subdividing if desired.

The ratio of wash time to sample time is from 90/170 or 53% of sample time to 170/90 or 190% of sample time. Should analytical requirements demand, the cycles can be varied, by following the disclosed principles, to permit greater variation.

Whereas the above functions are readily understood from the diagrammatic illustration in FIGURE 1, a description of a mechanism to accomplish these steps is a bit more complex, as shown in the following figures.

As shown in FIGURE 2, the sample cup rack 27 is a separate plate having a plurality of concentrically arranged apertures 28, each adapted to hold a sample cup 25. The sample cup rack shown has four concentric rows of apertures, each of which is arranged so that the one aperture from each row is on the arc of a circle under the aspirator tube 21 as the aspirator tube swings from concentric row to concentric row. The sample cup rack is supported on four sample cup rack legs 29. The sample cup rack has a center hole 30 which fits over a rack spindle 31. The rack spindle is coaxial with an index plate 32. The sample cup rack is supported above the index plate on the sample cup rack legs 29, one of which fits in an angularly adjustable zero-setting arm 33 which is locked to the index plate 32 by a thumb screw 34. Normally the sample cup rack legs which fit in the zero-setting arm is smaller than the others to guarantee that the sample cup rack can be placed in only one position. A plurality of sample cup racks are used with the same arrangement of apertures and sample cup rack legs. The size of sample cups in different sample cup racks may vary.

Conveniently, but not necessarily, each aperture in the sample cup rack has a number stamped in the sample cup rack corresponding to such aperture with number 1 corresponding to the sample first withdrawn as the machine is started. Usually it is unnecessary to change the positioning of the zero-setting arm as sample cup racks are changed. In use a sample cup of appropriate size and shape is placed in each working aperture, and a substantially spherical ball 24 is placed over the sample cup to minimize evaporation losses, protect the contents of the sample cup from contaminating dust and reduce the access of air to the sample. A perfect seal is not normally obtained as commercial tolerances in the rim of the sample cup permits slight leakage. Where such leakage is undesirable a thin film of oil or petroleum jelly or an inert liquid such as ethylene glycol or propylene glycol or even water may be used on either the ball or rim of the sample cup to introduce just enough of the sealing liquid to seal the ball to the sample cup by capillarity and prevent the access of any air whatsoever to the sample until just prior to the actual withdrawal of the sample. Slightly volatile or non-volatile liquids give greater sealing life. The depth and size of the sample cup can be varied over wide limits with the device being adapted to withdraw the desired quantity of sample from each cup.

Figure 5:
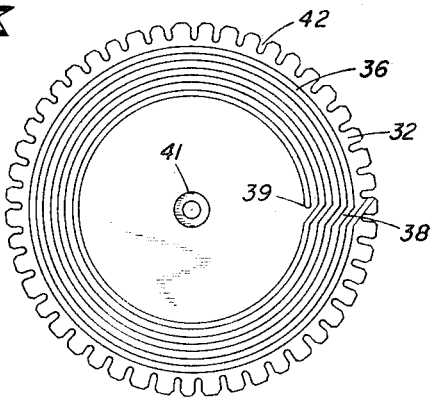

The index plate 32 is mounted for free rotation on the rack spindle 31 which rack spindle is supported on a frame 35. As shown in FIGURE 5, underneath the index plate are a series of concentric tracking cam grooves 36. The tracking cam grooves receive a tracking cam follower 37 (FIGURE 6) which controls the position of the wash cup 22 with respect to the index plate. The tracking cam grooves are cut to follow concentric circles except for a row changer spiral 38 so proportioned that when the cam follower starts from the start position 39 the wash cup and the aspirator tube 21 are positioned over the first cup in the sample cup rack in phase C or D, and serially each cup is sampled until each concentric row is completed. After the aspirator tube raises from the last cup in a concentric row, the index plate turns and as it turns the cam follower follows the row changer spiral and moves outward to an initial cup in the next outer row. As each concentric row is completed the aspirator tube is moved over to a following row and after the outside row is completed the cam follower is displaced outwardly and hits a stop switch 40 which signals that the sampling operation has been completed. Preferably the timing is arranged to stop while the aspirator tube is still down in the wash cup, so washing can continue, or the cycle interrupted at a time chosen by the operator. As soon thereafter as is convenient the sample cup rack is removed, the index plate 32 is lifted or rotated backwards to place the cam follower in the start position again and a subsequent sample cup rack with a subsequent group of samples is positioned. The index plate 32 conveniently has an index plate hub 41 which fits over the rack spindle 31 and is long enough to both support the index plate and keep the index plate from rocking with respect to the remainder of the mechanism.

The outside of the index plate has a series of index notches 42 in coordinate position with respect to the sample cup rack, which index notches are used to index the index plate one sample cup at a time; the indexing means is described below.

Drive mechanism

Figure 6:
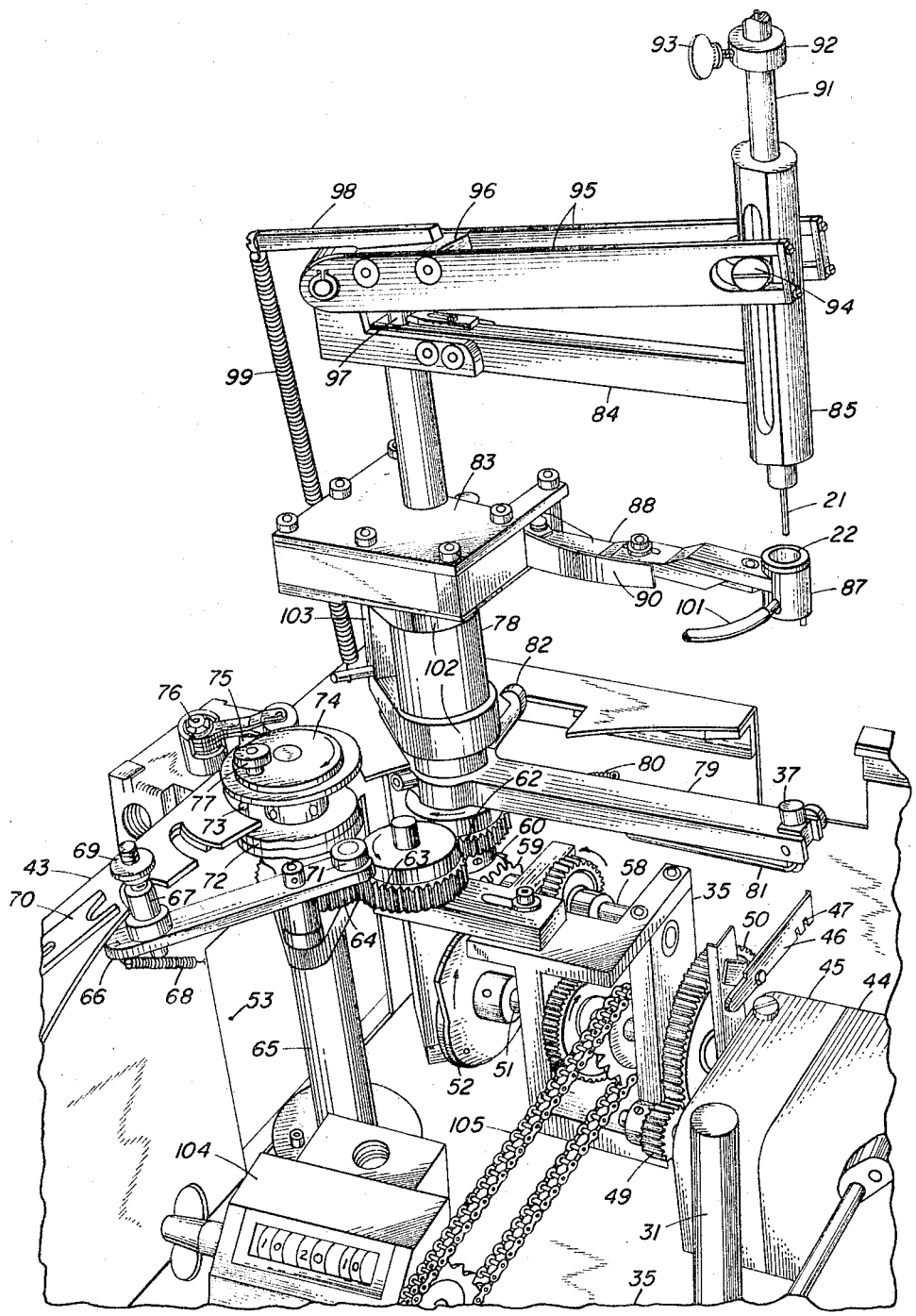
Figure 7:
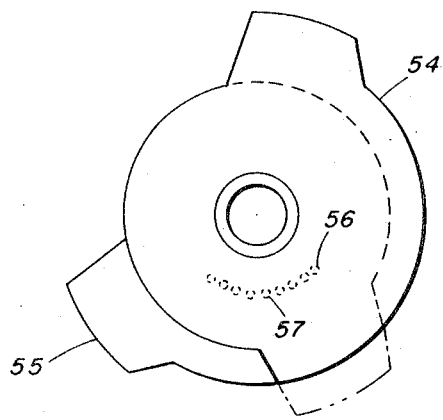

The drive mechanism in general is enclosed in a protective box 43 which serves to protect the drive mechanism from accidental contamination with reagents and, conversely, the operators from accidental contact with the drive mechanism. As shown in FIGURE 6, inside the protective box is an electric motor 44 which drives an adjustable variable-speed gear box 45. The speed ratio is set by a speed control arm 46 which projects outside of the protective box, as shown in FIGURE 2. Speed notches 47 can be cut in the speed control arm, which notches engage the side of the box to hold the speed control arm in any of several preset speed ratios. Power is supplied to the motor through explosion-proof wiring 48. The output gear 49 from the variable-speed gear box engages an idler shaft drive gear 50, mounted on an idler shaft 51, which shaft is conventionally journaled in the frame, on the end of which is the aspirator vertical lift cam 52. The aspirator vertical lift cam 52 is at the end of the shaft accessible through a cam change door 53 which permits access to the cam for changing the timing relationships. Preferably this cam is an adjustable cam to control the time at each height of the aspirator tube 21. As shown in FIGURE 7, this cam consists of two parts, a fixed cam part 54 which causes the lifting of the aspirator tube from the sample height to full height to permit the wash cup to swing into place and then drops to the wash height. A shiftable cam part 55 lifts the cam from the wash height to permit the wash cup to swing out of position and then drops the aspirator tube to the sample height. The shiftable cam part may be shifted from the position shown in dotted lines corresponding to the maximum sampling time to the position shown in full lines corresponding to the maximum washing time or locked anywhere between. Conveniently there is a lock pin 56 on the fixed cam part which can be set in any of the nine locking holes 57 in the shiftable cam part and thus positive increments of ten degrees obtained. As previously mentioned, the number of holes and hence the increments of shifting can be readily changed for any particular analytical procedure or if desired, nonadjustable cams can be used and the entire cam changed to modify the cycle.

Parallel and in geared relationship to the idler shaft 51 is the auxiliary shaft 58, suitably journaled, which drives a first crown gear 59, which in turn drives a second crown gear 60. The second crown gear rotates a hollow vertical shaft 61.

On the hollow vertical shaft is an index drive gear 62 which through an index idler gear 63 drives an index gear 64. On the same support 65 as journals the index gear 64 is pivoted an index detent arm 66 on which is mounted the index detent 67. The index detent arm and index detent are biased by an index spring 68, only part of which is shown, so that the index detent is biased into the index notches 42 in the index plate 32 and holds the plate in position. Above the index detent is an index detent handle 69, by which the index detent can be pulled out from the index notches, and an index lock out 70, a sliding bar with a U-shaped end positioned to lock the index handle and the index detent out of contact with the index plate during loading or when it is desired that the plate spin free. At the other end of the index detent arm 66 is the index cam follower 71 which rides on the index cam 72, which index cam rotates with the index gear 64. Also on the index cam is the index pin 73 which rotates on a small radius at such a location that the index pin acting as a one-tooth gear picks up and drives the index plate one notch for each revolution. The index cam causes the index detent to be lifted out of contact with the index plate during the indexing operation but drops the index detent back into the index notch 42 to positively lock the index plate in exact position if due to wear the index pin does not give the exact angular rotation to the index plate corresponding to the angle between notches. This mechanism using an index pin and an index detent is a minor modification of a conventional Geneva, but which is more desirable for small angular rotations of the driven plate. A conventional Geneva drive may be used if the mechanical tolerances are kept small enough so that the desired accuracy of indexing is achieved. A spring-loaded detent is preferred so that tolerances and mechanical wear have a minimal effect on the position of each index cup during the life of the apparatus.

Also mounted above the index cam is a peak reading cam 74 having a peak lobe 75 which actuates the peak switch 76. The peak reading cam is settable with respect to the index gear and locked in position by a peak lock screw 77. The function of the peak switch is to give a reading pulse so that a readout device can be actuated in adjustably timed relationship to sample withdrawal. With some of the automated analyzer devices used with the present sample feeder a peak reading for each sample is desired, and depending upon the length of tubing and time delay in the analyzing mechanism, the peak may occur at any time with respect to the initiation of sample withdrawal but occurs at a constant time with respect to the sample withdrawal and, hence, the peak-reading cam is settable to actuate the peak-reading mechanism of the automated analyzer at any desired time with respect to the sampling cycle. Not all automated equipment requires a peak signal and, hence, for some automated analyses the signal from this switch may not be used. The availability of the signal and its accurately timed relationship increases the flexibility of the sample feeding apparatus.

Aspirator tube control

Concentric with the hollow vertical shaft 61 is the aspirator support 78 from which extends the cam follower bar 79. The end of the cam follower bar is forked and pivoted therein is the cam follower 37. The cam follower is kept in vertical position by a cam follower spring 80 acting through a bell crank 81 which is disengageable by the cam follower release 82. In operation this provides for the cam follower to be rotated out of contact with the tracking cam grooves 36 so that the cam follower bar 79 may be turned back to the initial groove and reengaged in the starting position 39 without having to rotate the index plate 32 backwards through several complete revolutions. Attached to the aspirator support 78 is a wash cam box 83 to which is attached the aspirator support 84 at the end of which, and in fixed relationship with the cam follower 37 is the aspirator guide 85. The aspirator guide is conveniently a hollow tube with side slots. At the upper end of the hollow vertical shaft 61 in the wash cam box 83, is the wash cam 86 (FIGURE 3). The wash cup 22 fits in a wash cup holder 87 supported on the wash cup arm 88. The wash cup arm is pivoted with respect to the wash cam box 83 and has at the end, away from the wash cup holder, the wash cup cam follower 89 which rides on the wash cam 86 and is kept in contact therewith by a wash cup spring 90. The wash cam is similar in construction to the aspirator vertical lift cam in that it has two plates so that the working angle can be changed. The timing of the wash cam is adjusted to coordinate with the aspirator vertical lift cam in order that the wash cup is swung into position during phase A, kept in position during phases B, C and D, and swung away during phase E so that the wash cup is in position during the wash phases and swung out of the path of the aspirator tube during the sampling phases. The wash cup arm is pivoted in the wash cam box which swings angularly with the aspirator support arm and thus is indexed to position under the aspirator guide. As the angular change in the position of the aspirator support arm 84 also causes a change in the angular position of the wash cup cam follower 89; the wash cup index in, phase A, and wash cup index out, phase E, are each set at 30° although the actual indexing takes only about 10°. The extra 20° compensates for four angular steps of 5° in the position of the aspirator support arm 84. A planetary gear system or lever linkage system or pneumatic, hydraulic or electrical indexing control could be incorporated instead to provide for swinging the wash cup in and out of position but the reduction in the time of indexing is normally not sufficiently useful to warrant the additional complexities and possibilities for failure of such alternatives.

*Aspirator lift system*

The aspirator tube 21 slides up and down in the aspirator guide 85 positioned in an aspirator holder 91. The aspirator holder 91 has an aspirator depth adjusting collar 92 locked to the aspirator with a depth thumb screw 93 which is set so that the aspirator tube 21 drops to the desired depth when the aspirator adjusting depth collar hits the upper end of the aspirator guide 85. Trunnions 94 extend from the side of the aspirator holder 91 and fit into the slotted ends of the aspirator control arms 95. The aspirator control arms are pivoted at the back end of the aspirator support arm 84 with a block 96 between the arms resting one the lift rod 97. The lift rod 97 extends axially through the aspirator support 78 and the hollow vertical shaft 61 down to and rests on the aspirator vertical lift cam 52. Thus as the aspirator vertical lift cam 52 rotates, it actuates the lift rod 97 which through the aspirator control arms 95 controls the lift of the aspirator holder 91 and drops the aspirator tube 21 into either the wash cup 22 or a sample cup in the appropriate timed relationship above described. The sample feed tube can be flexible and pinched when the aspirator tube is lifted, so that suction can be supplied only when the tube is immersed in liquid if desired, for any analysis where the segmentation by air bubbles is deleterious. A counterbalance bar 98 extends from the back of the block 96 and engages a counterbalance spring 99 which is strong enough to support part of the weight of the aspirator tube and associated parts so that the aspirator tube is only partially under the influence of gravity and, hence, if a sample cup is the wrong depth, the aspirator tube 21 does not drop with sufficient force to break the cup but, instead, descends gently into contact with the sample cup. A sample aspirating tube 100 extends from the upper end of the aspirator holder 91 to the analyzing equipment and a wash supply tube 101 extends to a wash liquid constant level supply, not shown, which maintains the wash liquid at constant level in the wash cup 22.

The wash cam box 83 and the aspirator support 78 are preferably of one piece or fastened to each other, with the aspirator support 78 resting in support collars 102 attached to a support bracket 103. The entire mechanism conveniently rests on the upper collar in which the aspirator support can pivot.

Obviously, other mechanical expedients for support of the mechanism and drive details will suggest themselves to those skilled in the art.

Internally of the protective box 43 is a counter 104 driven by a chain 105 from the idler shaft 51. The counter can be a simple numerical counter which records serially the total number of samples fed or may be an automatic counter which will turn off the machine after a certain number of samples, or give such other indication as the operator may desire.

Figure 8:
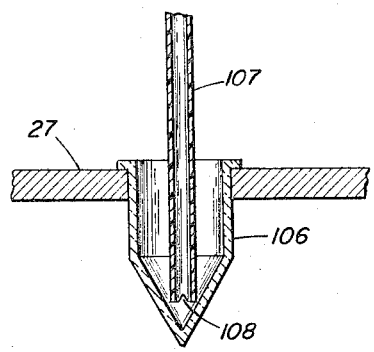

FIGURE 8 is a detail view showing a pointed sample cup 106 in the sample cup rack 27. The aspirator tube has a polytetrafluoroethylene tip 107 which has notches 108 therein. The polytetrafluoroethylene is slick in its own right and slides to the bottom of the pointed glass tube. The notches prevent the tube from sealing against the bottom of the pointed glass tube and permit aspiration of the entire sample, for analyses where such is desired.

Figure 9:
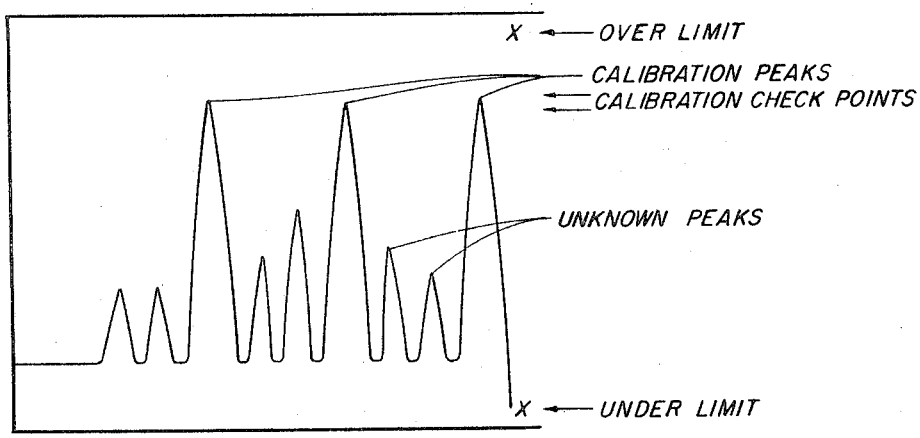

FIGURE 9 shows a line recording of the analytical values as determined by a line recorder. The concentration values of the wash liquid correspond to the low values and the peaks correspond to the sequential samples being fed. Diagrammatically each third peak is shown as a calibration peak with each third sample cup containing a known calibration sample. These peaks serve as a check to insure that the analysis is proceeding as planned and serve as check points from which to count samples. In one embodiment the recording mechanism is set to compare the height of each calibration peak automatically with calibration peak points and if any calibration peak is out of control stop the apparatus and conserve the remaining samples. Similarly, an underlimit and an overlimit are established so that if the recorder goes over or under the limit values the machine stops to conserve the remaining samples. Conveniently, also the machine is set so that if on any wash the reading does not return to zero or if on any sample a positive reading is not obtained the machine stops automatically to conserve the remaining samples. The selection of safety control points depends in part on the samples being run.

Figure 10:
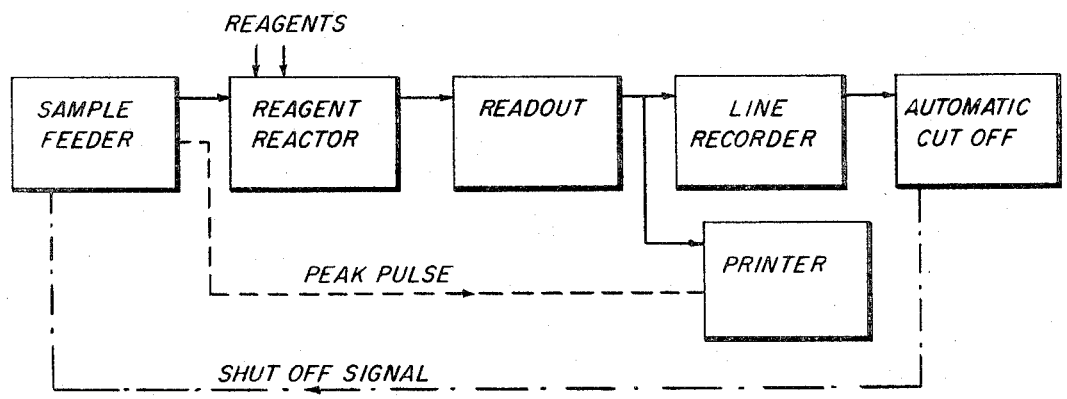

FIGURE 10 is a diagrammatic view showing the sample feeder and reagents, each being supplied, conveniently, through adjustably proportioned pumps to a reagent reactor, that is any preferred type of an automatic analysis dialyzer or reactor and from which the sample is sent through a read-out which measures conductivity, or some light transmission or absorption characteristic, depending on the test being run, which transmits an electrical signal to a line recorder which gives the peak record values as shown in FIGURE 9, and also to a printer. The printer is a conventional commercial item which prints the value of the readout when a printing pulse is received. The sample feeder has the peak reading cam 74 set in such timed relationship that the peak pulse signals the printer to print as the peak value is passing through the readout. The delay in the cam is set to allow for the processing time in the analysis equipment. The printer can be calibrated directly, or fed through an analog computer so the printed readout for each sample is precalculated in desired units of measurement.

The automatic cutoff is an electronic device to determine overlimit values, underlimit values, or out of calibration peaks, to shut off the device by sending a shut-off signal to the sample feeder when an error is detected. Preferably, the machine is set to shut off only during the wash cycle so that all equipment is washed clean no matter what the reason for stopping the sample feeder.

Figure 11:
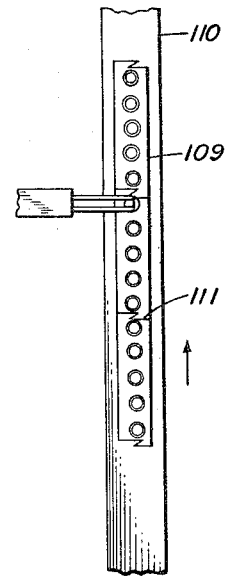
FIGURE 11 shows a continuous belt feed apparatus.

FIGURE 11 is a diagrammatic view of a modification using a continuous belt feed in which rather than a rotary plate, individual pallets 109 are fed along a belt 110 with a lock 111 locking together successive pallets. Using a belt, the number of individual samples which can be supplied is limited only by the length of the belt or the capacity of a belt feed mechanism for placing the pallets on the belt.

Figure 12:
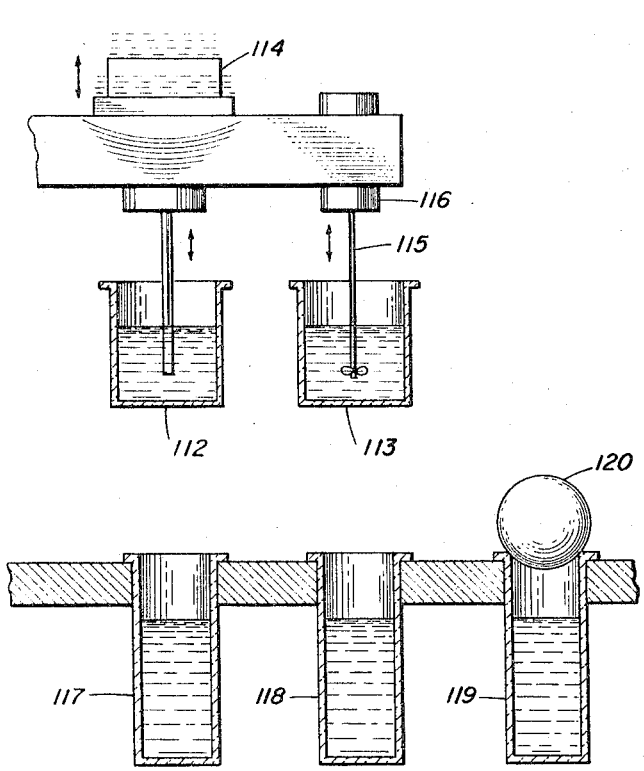
FIGURE 12 shows a double wash cup with an agitator to stir samples.

FIGURE 12 shows a modification using a double wash cup in which two separate wash cups, a first wash cup 112 and a second wash cup 113, are mounted in the wash cup holder. The aspirator holder has two working positions. The first has the normal aspirator tube. In this modification it is mounted in a pulser 114 which causes the sample tube to move up and down to break each wash or sample into a group of separate segments separated by air bubbles. Also in the aspirator guide is an agitator 115 mounted in an agitator drive 116 which rotates or reciprocates the agitator to cause the agitator to stir a sample just following the sample being tested and which agitator in turn is washed in the second wash cup 113. At the end of the wash cycle the aspirator guide drops the aspirator into the first sample cup 117 and the agitator into the sequential sample cup 118 with the sample being drawn from the first sample cup and the sample being stirred to insure homogeneity in the sequential sample cup. A following sample cup 119 still has a sealing ball 120 in position thereon.

The above description is illustrative of a preferred embodiment and certain alternatives in the present sample feeder. Other modifications in the sample feeder within the scope of the appended claims suggest themselves to those skilled in the art and variations may be made in the machine to adapt the feeder to any chosen analytical procedure. For example, heat control, light control, and ambient atmosphere control may be incorporated. The speed of sample feeding can be set to supply samples being fed at any rate found preferable for particular analytical equipment, which variations permit the machine to be used as a sample feeder for many analyzing techniques.

The printout can be any of the commercially available printouts for computers. Conveniently, if the peaks are not sharp, or because of noise, may be double peaks, a peak reading voltmeter can be used, which records the maximum signal voltage received, with the peak reading pulse delayed to cause printing of the maximum voltage, and then discharge to zero voltage preparatory to receiving the next peak. Area computing integrating readouts are useful for any analysis where area under the curve is significant.

The entire programming may be done on a tape, and all functions designed to operate separately from a tape input, so the length of each cycle is programmed independently. Similarly, electromechanical delay mechanisms can be used to interrupt and lengthen any portion of the cycle desired. The device as described is a simple readily operated and nearly failure proof embodiment that has marked economic advantages.

Having described exemplary modifications thereof as our invention, we claim:

1. An apparatus for feeding separate discrete individual liquid samples to an automated analyzing mechanism comprising: means for sequentially supplying, in order, a plurality of samples in separate sample cups, individual readily displaceable balls covering such sample cups, means to remove the ball from each sample cup just prior to feeding of a particular sample, means to lower an aspirator tube into individual samples sequentially, and after a desired portion of each sample has been removed to raise the aspirator tube, then lower the aspirator tube into an interposed wash liquid, means to interpose a wash liquid container having a wash liquid therein in the path of the aspirator tube at a level above the sample cups, and displace said wash liquid container after the aspirator tube is raised therefrom, means to maintain the liquid level of the wash liquid constant, means to lift the aspirating tube from the wash liquid and immerse in a subsequent sample cup, and means to index the sample cups so that a subsequent sample cup is in position under the aspirating tube as the tube descends after the washing cycle.

2. The apparatus of claim 1 in which the sample cup feed means is a cylindrical plate having arranged therein, sequentially, a comparatively large number of sample cups, in a plurality of concentric rows.

3. The apparatus of claim 2 in which the cylindrical plate containing samples is separable and may be changed as a unit.

4. The apparatus of claim 1 in which the means to lower an aspirating tube has incorporated means to reciprocate vertically said tube to incorporate air bubbles between increments of each sample, between each sample and a subsequent wash liquid, and between increments of the wash liquid.

5. The apparatus of claim 1 including additionally means to subsequently treat the aspirated liquid to develop a characteristic indicative of the quantity of a selected component, means to measure said characteristic, means to readout said characteristic and means associated with said readout means to stop the apparatus if the results reported by the readout are inconsistent with known operating ranges.

6. The apparatus of claim 5 which includes means to stop the mechanism if the readout is below and remains below a minimum value.

7. The apparatus of claim 5 which includes means to stop the mechanism if the readout is at or remains at more than a maximum value.

8. The apparatus of claim 1, including means for adjusting the ratio of wash time to sample feed time.

9. The apparatus of claim 8, including means for changing the feed rate of the entire machine.

10. An apparatus for feeding separate discrete individual liquid samples to an automated analyzing mechanism comprising: means for sequentially supplying, in order, a plurality of samples in separate sample cups, individual balls covering such sample cups, means to remove the ball from each sample cup, just prior to feeding of a particular sample, attached to the hereinafter recited means to swing the wash cup, means to lower a vertically moving aspirator tube into individual samples sequentially, and after a desired portion of each sample has been removed to raise the sample tube, then lower the aspirator tube into an interposed wash liquid, a wash cup for washing liquid, means to swing said wash cup under the aspirating tube prior to the wash cycle, swing the wash cup out of the path of the aspirating tube after the wash cycle, means to maintain the liquid level of the wash liquid constant, means to lift the aspirating tube from the wash liquid and immerse in a subsequent sample cup, and means to index the sample cups so that a subsequent sample cup is in position under the aspirating tube as the tube descends after the washing cycle.

11. The apparatus of claim 10 in which the means for lowering the aspirating tube additionally has means for agitating a sample in a subsequent cup as one sample is withdrawn.

12. The apparatus of claim 10 in which the aspirating tube has means to aspirate only while the aspirating nozzle is below the level of a liquid, said liquid including both the sample liquid and the wash liquid.

References Cited by the Examiner

UNITED STATES PATENTS

| | | | |
|---|---|---|---|
| 2,665,585 | 1/1954 | Marcell et al. | 141—130 X |
| 3,107,537 | 10/1963 | Isreeli et al. | 73—423 |
| 3,134,263 | 5/1964 | De Jong | 73—423 |
| 3,193,359 | 6/1965 | Baruch et al. | 23—253 X |
| 3,230,776 | 1/1966 | Isreeli et al. | 73—423 |

FOREIGN PATENTS 33,565 8/1924 Denmark.

LOUIS R. PRINCE, *Primary Examiner.*

S. C. SWISHER, *Assistant Examiner.*